United States Patent
Huang et al.

(10) Patent No.: US 10,964,307 B2
(45) Date of Patent: *Mar. 30, 2021

(54) METHOD FOR ADJUSTING VOICE FREQUENCY AND SOUND PLAYING DEVICE THEREOF

(71) Applicant: Unlimiter MFA Co., Ltd., Eden Island (SC)

(72) Inventors: Yu-Chieh Huang, Taipei (TW); Kuan-Li Chao, Taipei (TW); Neo Bob Chih-Yung Young, Taipei (TW); Kuo-Ping Yang, Taipei (TW)

(73) Assignee: PIXART IMAGING INC., Hsin-Chu (TW)

( * ) Notice: Subject to any disclaimer, the term of this patent is extended or adjusted under 35 U.S.C. 154(b) by 106 days.

This patent is subject to a terminal disclaimer.

(21) Appl. No.: 16/360,050

(22) Filed: Mar. 21, 2019

(65) Prior Publication Data

US 2019/0392812 A1  Dec. 26, 2019

(30) Foreign Application Priority Data

Jun. 22, 2018 (TW) ................ 107121549

(51) Int. Cl.
- *G10L 13/033* (2013.01)
- *G10L 15/22* (2006.01)
- *G10L 25/21* (2013.01)
- *G10L 25/84* (2013.01)

(52) U.S. Cl.
CPC ............ *G10L 13/033* (2013.01); *G10L 15/22* (2013.01); *G10L 25/21* (2013.01); *G10L 25/84* (2013.01)

(58) Field of Classification Search
CPC ....... G10L 13/033; G10L 15/22; G10L 25/21; G10L 25/84
See application file for complete search history.

(56) References Cited

U.S. PATENT DOCUMENTS

| | | | | |
|---|---|---|---|---|
| 5,459,813 A * | 10/1995 | Klayman | ............ | G10L 21/0364 704/209 |
| 5,752,226 A * | 5/1998 | Chan | ................... | G10L 21/0208 704/233 |
| 6,768,979 B1 * | 7/2004 | Menendez-Pidal | ...... | F16J 15/43 704/226 |
| 6,993,480 B1 * | 1/2006 | Klayman | ............ | G10L 21/0364 704/225 |

(Continued)

*Primary Examiner* — Fariba Sirjani
(74) *Attorney, Agent, or Firm* — Bacon & Thomas, PLLC

(57) ABSTRACT

A method far adjusting a voice frequency and a sound playing device thereof are disclosed. The method includes the following steps: acquiring an input voice; when the input voice has a consonant, performing: detecting whether a main frequency range of the consonant has an ambient sound and an energy of the ambient sound is enough to disturb the consonant; if not, the frequency of the consonant is not shifted and the consonant is output; and if so, the consonant is shifted to a target frequency to avoid the ambient sound to form a frequency-shifting consonant. Then the frequency-shifting sub-note consonant is output to form an output voice. The target frequency is located near the main frequency of the consonant, and no other ambient sound exists in the target frequency and no the energy of the other ambient sound is enough to disturb the consonant.

14 Claims, 4 Drawing Sheets

(56) References Cited

U.S. PATENT DOCUMENTS

| | | | | |
|---|---|---|---|---|
| 8,280,087 | B1* | 10/2012 | Bacon | A61N 1/36038 |
| | | | | 381/316 |
| 9,311,933 | B2* | 4/2016 | Young | G10L 25/90 |
| 9,787,824 | B2* | 10/2017 | Young | G10L 21/0364 |
| 2003/0179888 | A1* | 9/2003 | Burnett | G10L 21/0208 |
| | | | | 381/71.8 |
| 2007/0156399 | A1* | 7/2007 | Matsuo | G10L 21/0208 |
| | | | | 704/233 |
| 2008/0162119 | A1* | 7/2008 | Lenhardt | G10L 21/0364 |
| | | | | 704/200.1 |
| 2009/0226015 | A1* | 9/2009 | Zeng | H04R 25/353 |
| | | | | 381/316 |
| 2010/0040249 | A1* | 2/2010 | Lenhardt | H04R 25/502 |
| | | | | 381/316 |
| 2012/0191450 | A1* | 7/2012 | Pinson | G10L 15/20 |
| | | | | 704/233 |
| 2014/0072156 | A1* | 3/2014 | Kwon | H04R 25/453 |
| | | | | 381/318 |
| 2014/0358530 | A1* | 12/2014 | Young | G10L 25/90 |
| | | | | 704/207 |
| 2015/0367132 | A1* | 12/2015 | Milczynski | H04R 25/606 |
| | | | | 607/3 |
| 2017/0195803 | A1* | 7/2017 | Anderson | H04R 25/70 |
| 2018/0336274 | A1* | 11/2018 | Choudhury | G06F 16/683 |
| 2019/0362734 | A1* | 11/2019 | Huang | G10L 21/0232 |
| 2019/0392812 | A1* | 12/2019 | Huang | G10L 25/84 |

* cited by examiner

METHOD FOR ADJUSTING VOICE FREQUENCY AND SOUND PLAYING DEVICE THEREOF

BACKGROUND OF THE INVENTION

1. Field of the Invention

The present invention relates to a method for adjusting voice frequency and a sound playing device thereof, particularly to a method for adjusting voice frequency and a sound playing device thereof, which can avoid the impact of ambient sound.

2. Description of the Related Art

It is now a common technique for users to listen to sounds using devices such as audio equipment, portable audio player, or smart phone. The users are not only listening to music, but also listening to simple voice signals. However, when listening to voice signals, the signals may be disturbed by external sounds. In the prior art, it is usually necessary to analyze all frequency bands to identify; the external noise frequency, but this method takes longer to process. Moreover, if the external noise frequency changes, the sound playing device cannot be adjusted immediately.

Accordingly, it is necessary to devise a new method for adjusting voice frequency and a sound playing device thereof to solve the problem in the prior art.

SUMMARY OF THE INVENTION

It is a major Objective of the present invention to provide a method for adjusting voice frequency, which can avoid the impact of ambient sound.

It is another major objective of the present invention to provide a sound playing device used in the above method.

To achieve the above objectives, the method for adjusting voice frequency in the present invention is used for the sound playing device. The method includes the following steps: acquiring an input voice; when the input voice has a consonant, performing: detecting whether a main frequency range of the consonant has an ambient sound and an energy of the ambient sound is enough to disturb the consonant; if not, the frequency of the consonant is not shifted and the consonant is output; and if so, the consonant is shifted to a target frequency to avoid the ambient sound to form a frequency-shifting consonant. Then the frequency-shifting sub-note consonant is output to form an output voice. The target frequency is located near the main frequency of the consonant, and no other ambient sound exists in the target frequency and no the energy of the other ambient sound is enough to disturb the consonant.

A sound playing device in the present invention includes a voice acquisition module, a sound detector, a voice processing module, and a speaker module. The voice acquisition module is used for acquiring an input voice. The sound detector is used for detecting ambient sound. A noise analysis module is electrically connected to the sound detector for analyzing the frequency range of ambient sound. The voice processing module is electrically connected to the voice acquisition module and the sound detector. When the input voice has a consonant, the voice processing module detects whether a main frequency range of the consonant has an ambient sound and an energy of the ambient sound is enough to disturb the consonant; if not, the frequency is not shifted to the consonant and the consonant is output; and if so, the consonant is shifted to a target frequency to avoid the ambient sound to form a frequency-shifting consonant, and then the frequency-shifting sub-note consonant is output to form an output voice; wherein the target frequency is located near the main frequency of the consonant, and no other ambient sound exists in the target frequency and no the energy of the other ambient sound is enough to disturb the consonant. The speaker module is electrically connected to the voice processing module for playing the output voice.

DETAILED DESCRIPTION OF THE PREFERRED EMBODIMENT

Hereafter, the technical content of the present invention will be better understood with reference to preferred embodiments.

Figure 1:
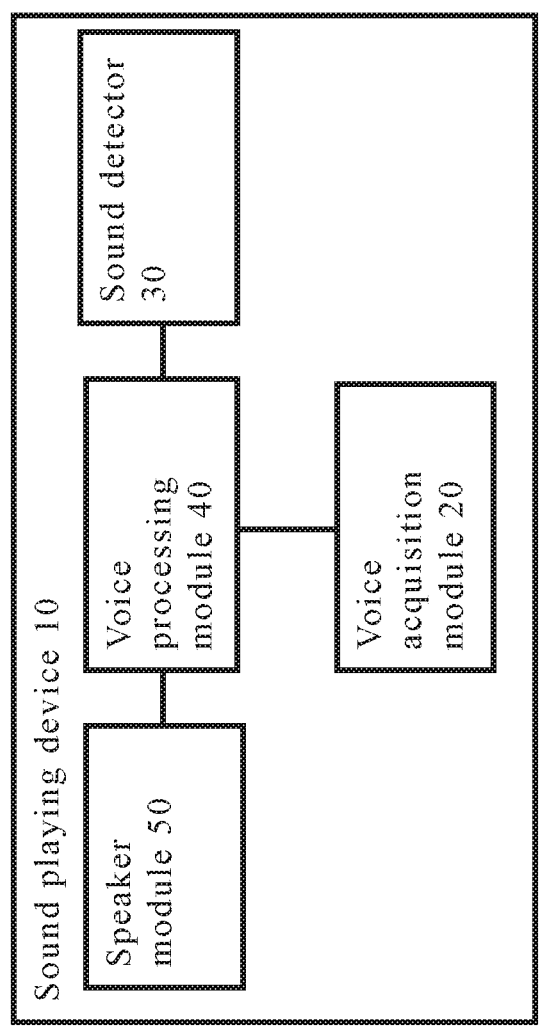
FIG. 1 is an architecture diagram of a sound playing device in the present invention.

Hereafter, please first refer to FIG. 1 which is an architecture diagram of a sound playing device in the present invention.

A sound playing device 10 in the present invention includes a voice acquisition module 20, a sound detector 30, a voice processing module 40 and a speaker module 50. The voice acquisition module 20 is used for acquiring an input voice. In different embodiments of the present invention, on the one hand, the voice acquisition module 20 may be a microphone or other sound receiving device to receive external voice. On the other hand, the voice acquisition module 20 may be a memory module for storing voice files to provide already stored voice. Even the voice acquisition module 20 may also be a text-to-speech (TSS) service module to play the text content, but the present invention does not limit the voice acquisition approach or path of the voice acquisition module 20.

The sound detector 30 may be a microphone, which is electrically connected to the voice acquisition module 20 for detecting the ambient sound outside the sound playing device 10. The ambient sound may be talking sound, car engine sound, etc., but the present invention is not limited thereto. The voice processing module 40 is electrically connected to the voice acquisition module 20 and the noise analysis module 40. The voice processing module 40 can identify a consonant of the input voice. In an embodiment of the present invention, mandarin phonetic symbols are used for illustration. As to the mandarin phonetic symbols, vowels are "ㄧ, ㄨ, ㄩ, ㄚ, ㄛ, ㄜ, ㄝ, ㄞ, ㄟ, ㄠ, ㄡ, ㄢ, ㄣ, ㄤ, ㄥ, ㄦ." and consonants are "ㄅ, ㄆ, ㄇ, ㄈ, ㄉ, ㄊ, ㄋ, ㄌ, ㄍ, ㄎ, ㄏ, ㄐ, ㄑ, ㄒ, ㄓ, ㄔ, ㄕ, ㄖ, ㄗ, ㄘ, ㄙ." Therefore, the voice processing module 40 first identifies the consonant and vowel in the input voice, and analyzes the individual frequency distribution in the consonant and vowel. For example, when a "ㄙㄠ (s ao)" sound is issued, the voice processing module 40 can know that the first syllable is "ㄙ (s)" and the second syllable is "ㄠ (ao)," and the frequency of the first syllable "ㄙ (s)" is analyzed to know the frequency of the consonant located.

Then, the voice processing module 40 determines whether the frequency range in which the consonant is located is clean, that is, determines whether an ambient sound exists in the main frequency range of a consonant of the input voice, and the energy of the ambient sound is enough to disturb the consonant. For example, if the energy of the ambient sound is M times the energy of the consonant, it is determined that the ambient sound exists and the energy of the ambient sound is enough to disturb the consonant, where $0.3 \leq M \leq 10000$, but the present invention does not limit the upper limit of M, nor limit the lower limit of M, which depends on the energy of the ambient sound enough to disturb the consonant. Thus, the voice processing module 40 adjusts the consonant frequency of the input voice to avoid the ambient sound, thereby forming an output voice. However, if the energy of the ambient sound is less than the minimum of M times the energy of the consonant, for example, the energy of the ambient sound is less than 0.3 times the energy of the consonant, the energy representing the ambient sound is insufficient to disturb the consonant, so the consonant is not processed and directly output to form an output voice.

However, if the energy of the ambient sound is enough to disturb the consonant, the consonant will be shifted to a target frequency by the voice processing module 40 to avoid the ambient sound, for example, to a higher frequency or a lower frequency, thereby forming a frequency-shifting consonant. The target frequency is located near the main frequency of the consonant. Also, no other ambient sound exists in the target frequency and no the energy of the other ambient sound is enough to disturb the consonant. For example, the voice processing module 40 will first check if other ambient sound exists in the higher frequency range of the consonant. The frequency range can be 300 Hz, but the present invention is not limited thereto. If other ambient sound exists in the higher frequency range, the voice processing module 40 will seek the lower frequency range of the consonant. After repeated execution, the voice processing module 40 can adjust the consonant frequency of the input voice to a clean range. Finally, the frequency-shifting consonant is output to form an output voice.

It should be noted that the method for adjusting frequency in the present invention is not limited to identifying a higher or a lower frequency range, and the present invention does not limit the adjustment range. Other methods may be used as long as a similar effect can be achieved. The consonant frequency range of the input voice is adjusted to be no more than 12000 Hz and no less than 3000 Hz, but the present invention is not limited to the values. Also, in another embodiment of the present invention, the voice processing module 40 can also retain the consonant of the input voice, such that the original consonant and the frequency-shifting consonant together form an output voice, but the present invention is not limited to the processing method. In addition, the voice processing module 40 does not process vowels in the input voice to avoid complete distortion of the input voice.

Finally, the speaker module 50 is electrically connected to the voice processing module 40 for playing the output voice. The speaker module 50 may be a headset or a speaker, but the present invention is not limited thereto. In this way, when used, the output voice played by the speaker module 50 can avoid the interference of the ambient sound.

It should be noted that each module in the sound playing device 10 may be configured as a hardware device, software program in combination with hardware device, or firmware in combination with hardware device, but the present invention is not limited in the manner described above. Additionally, the preferred embodiment of the present invention described here is only illustrative. To avoid redundancy, all the possible combinations of changes are not documented in detail. However, it shall be understood by those skilled in the art that each of the modules or elements described above may not be necessary. For the implementation of the present invention, the present invention may also contain other detailed, conventional modules or elements. Each module or component is likely to be omitted or modified depending on the needs. Other modules or elements may not necessarily exist between two of any modules.

Figure 2:
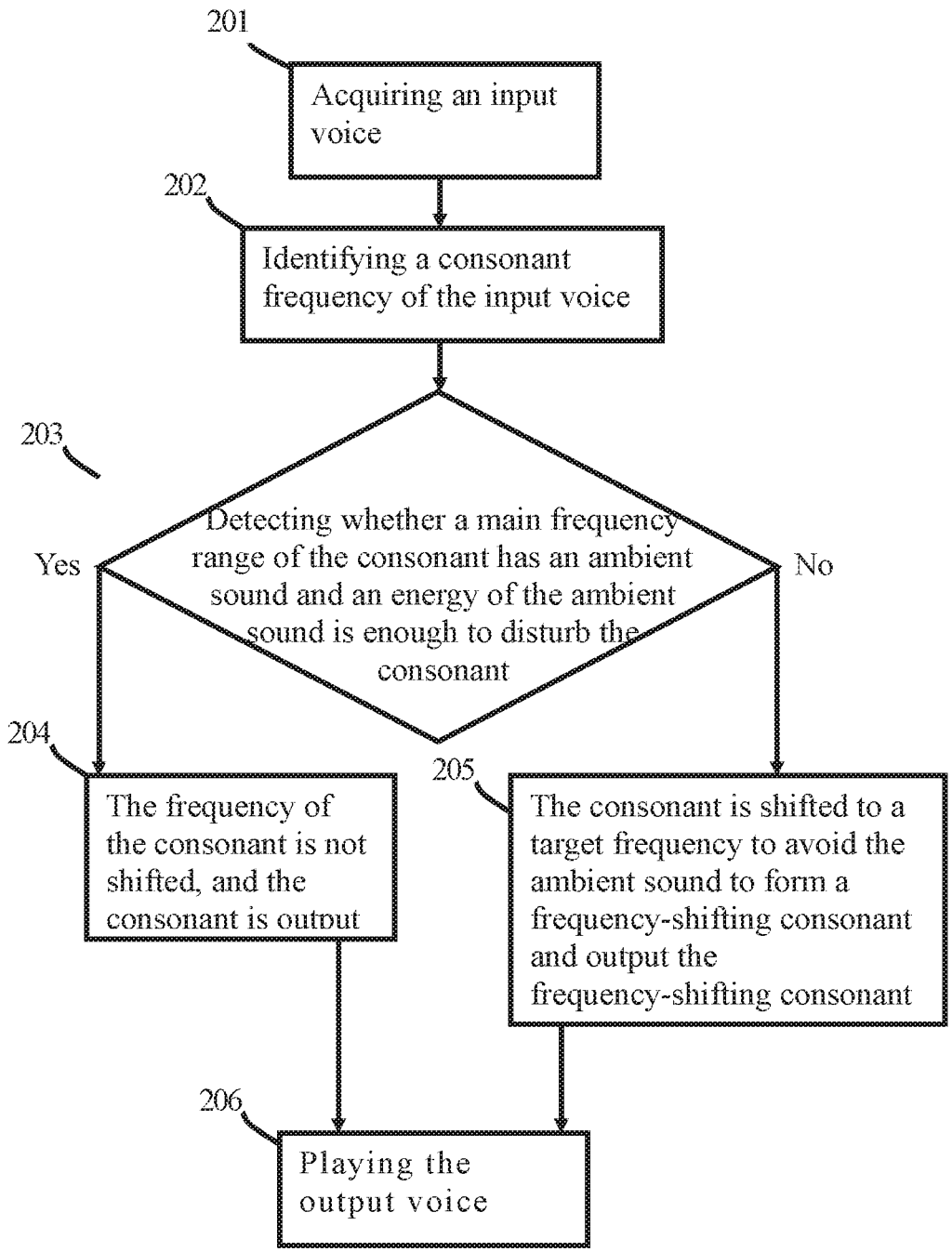
FIG. 2 is a flowchart showing steps in a method for adjusting voice frequency according to the present invention.

Then, please refer to FIG. 2 which is a flowchart showing steps in a method for adjusting voice frequency according to the present invention. It should be noted that, although the above-described sound playing device 10 is used as an example for illustrating the method for adjusting voice frequency in the present invention, the method in the present invention is not limited to the use of the sound playing device 10 with the same structure described above.

First, the sound playing device 10 performs Step 201: Acquiring an input voice.

The voice acquisition module 20 is used for acquiring an input voice. The input voice may be the external voice, the stored voice or the voice generated by the text-to-speech (TTS) service module, but the present invention is not limited thereto.

Then, in Step 202: Identifying a consonant frequency of the input voice.

Figure 3A:
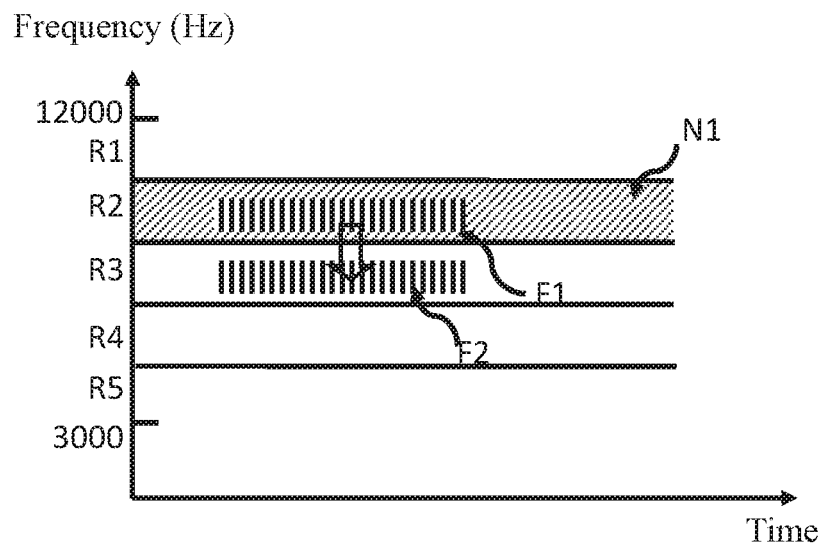
FIGS. 3A-3C are schematic diagrams showing the relationship between the ambient sound frequency and consonant of the input voice in the present invention.

The voice processing module 40 can idea a consonant of the input voice and acquire its frequency. Hereafter, please refer to FIGS. 3A-3C about the relationship between the frequency of the ambient sound and a consonant of the input voice in the present invention. In FIG. 3A, the voice processing module 40 identifies the consonant frequency F1 in the range R2.

Next, in Step 203: Detecting whether a main frequency range of the consonant has an ambient sound and an energy of the ambient sound is enough to disturb the consonant.

Figure 3B:
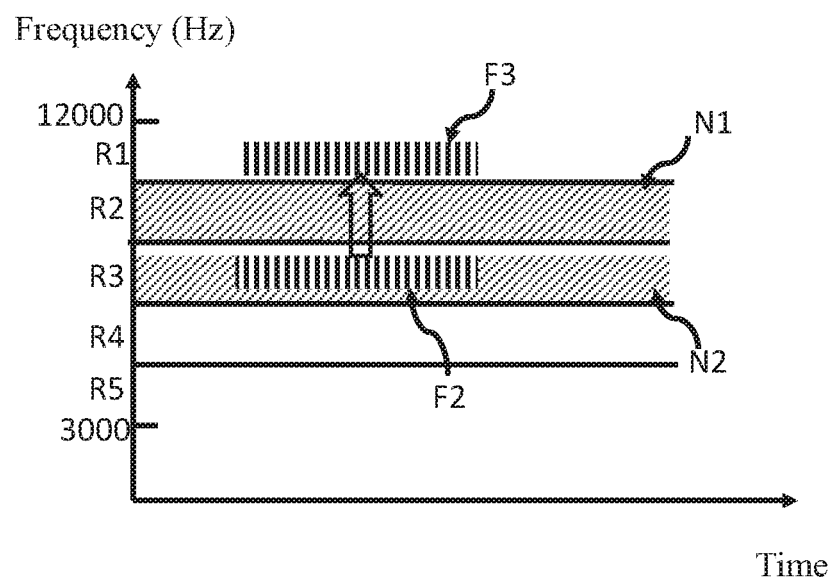
Figure 3C:
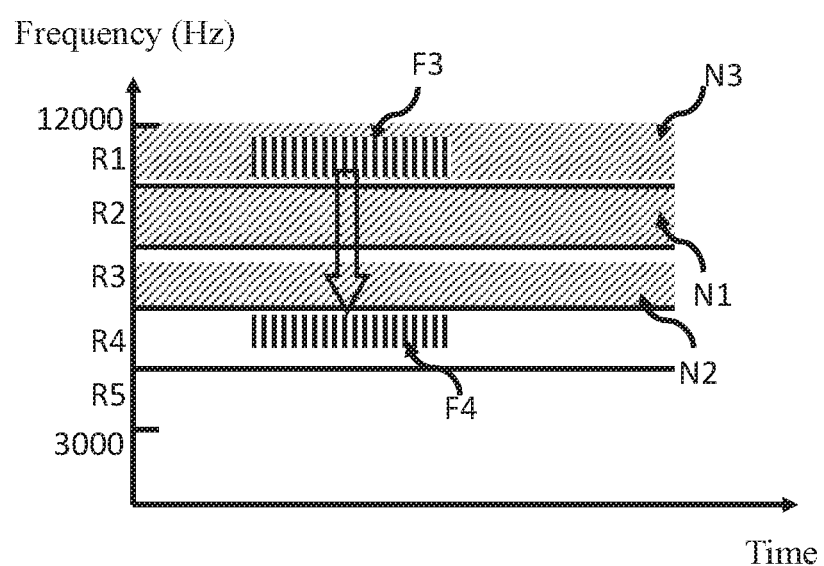

After the sound detector 30 detects the ambient sound outside the sound playing device 10, the voice processing module 40 analyzes whether the main frequency range of the consonant has an ambient sound and the energy of the ambient sound is enough to disturb the consonant. In FIG. 3A, for example, the voice processing module 40 knows that the main frequency range where the consonant F1 is located, that is, the frequency range R2 has an ambient sound N1. It should be noted that the frequency ranges R1 to R5 are only for convenience of illustration, and the present invention is not limited to being cut into frequency ranges R1 to R5 as shown in FIGS. 3A to 3C.

If the voice processing module 40 confirms that the main frequency range of the consonant has no ambient sound or the ambient sound has insufficient energy to disturb the consonant, proceed to Step 204: The frequency of the consonant is not shifted, and the consonant is output.

At this time, the voice processing module 40 does not process the consonant, and directly outputs the consonant to form an output voice.

If the voice processing module 40 confirms that the main frequency range of the consonant has ambient sound and the energy of the ambient sound is enough to disturb the consonant, the voice processing module 40 proceeds to Step 205: The consonant is shifted to a target frequency to avoid the ambient sound to form a frequency-shifting consonant and output the frequency-shifting consonant.

The voice processing module 40 adjusts the consonant frequency of the input voice to a target frequency, to avoid the ambient sound and form a frequency-shifting consonant, thereby forming an output voice. The consonant frequency range of the input voice is adjusted to be no more than 12000 Hz and no less than 3000 Hz. In addition, the voice processing module 40 does not process vowels in the input voice. Thus, as shown in FIG. 3A, when the voice processing module 40 recognizes that the consonant F1 of the input voice in the frequency range R2 will be disturbed by the ambient sound N1, the voice processing module 40 adjusts the consonant F1 in the input voice to a lower target frequency, that is, within the frequency range R3, to be a frequency-shifting consonant, i.e. a consonant F2. Finally, the output voice is formed. The consonant F2 does not overlap with the frequency range of ambient sound N1, so the output voice can avoid the interference of the frequency range of ambient sound N1. It should be noted that the consonant is first shifted to a lower frequency by the voice processing module 40, but the present invention is not limited thereto. The consonant can also be first shifted to a higher frequency by the voice processing module 40.

In addition, the frequency range of the ambient sound may be larger than the adjustment frequency, or the interference of other ambient sound exists in the other frequency. As shown in FIG. 3B, an ambient sound N2 exists in the frequency range R3. Thus, when the consonant F1 in the input voice is shifted to the consonant F2 by the voice processing module 40, there is still an ambient sound N2 in the frequency range R3 of the consonant F2. Accordingly, the consonant F2 will then be shifted to the higher frequency range R1 by the voice processing module 40 to form a consonant F3.

In addition, as shown in FIG. 3C, if an ambient sound N3 is located in the frequency range R1, the voice processing module 40 will adjust the consonant F3 again, and the consonant F3 will be shifted to the lower frequency range R4 to form a consonant F4. When it is confirmed that no ambient sound exists in the frequency range R4 that affects the consonant F4, the consonant F4 is confirmed as the frequency-shifting consonant to be Output. It can be seen that the voice processing module 40 will repeatedly test the ambient sound in the higher or lower frequency range until a really clean one is found.

Finally, in Step 206: Playing the output voice.

The speaker module 50 plays the output voice. In this way, the output voice can avoid the noise interference. Also, the output voice can include not only the adjusted frequency-shifting consonant but the original input voice. In another embodiment of the present invention, the voice processing module 40 can also retain the consonant of the input voice. As shown in FIG. 3A, the original consonant F1 and the frequency-shifting consonant F2 can form an output voice, but the present invention is not limited to the processing method.

It should be noted here that the method of detecting the ambient sound to change the frequency of playing the voice in the present invention is not limited to the order of the above steps. The order of the above steps may be changed as long as the objectives of the present invention can be achieved.

In this way, according to the above embodiment, when using the sound playing device 10, the interference of the ambient sound can be avoided, and the sound playing device 10 does not need to analyze all the frequency bands, which can save processing time. When the frequency of ambient sound changes, the sound playing device 10 can also react instantly.

It should be noted that the preferred embodiments of the present invention described above are merely illustrative. To avoid redundancy, all the possible combinations of changes are not documented in detail. However, it shall be understood by those skilled in the art that each of the modules or elements described above may not be necessary. For the implementation of the present invention, the present invention may also contain other detailed, conventional modules or elements. Each module or component is likely to be omitted or modified depending on the needs. Other modules or elements may not necessarily exist between two of any modules. Furthermore, it is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A method for adjusting voice frequency, used for a sound playing device, the method comprising the following steps:
    acquiring an input voice;
    when the input voice has a consonant, performing:
    detecting whether a frequency range of the consonant has an ambient sound and an energy of the ambient sound is enough to disturb the consonant;
    if not, the frequency is not shifted to the consonant and the consonant is output;
    and if yes, the consonant is shifted to a target frequency to avoid the ambient sound to form a frequency-shifting consonant, and then the frequency-shifting sub-note consonant is output to form an output voice;
    wherein the target frequency is located in a closest frequency range to the frequency of the consonant, where no other ambient sound exists or the energy of any ambient sound present in the target frequency is not enough to disturb the consonant.

2. The method for adjusting voice frequency as claimed in claim 1, wherein the target frequency is higher or lower than the frequency range of the consonant.

3. The method for adjusting voice frequency as claimed in claim 1, further comprising the following step:
    when the energy of the ambient sound is M times the energy of the consonant, it is determined that the ambient sound exists and the energy of the ambient sound is enough to disturb the consonant, where $0.3 \leq M \leq 10000$.

4. The method for adjusting voice frequency as claimed in claim 1, further comprising the following step:
    when the energy of the ambient sound present in the target frequency is M times the energy of the consonant, it is determined that the ambient sound present in the target frequency exists and the energy of the ambient sound present in the target frequency is enough to disturb the consonant, where $0.3 \leq M \leq 10000$.

5. The method for adjusting voice frequency as claimed in claim 1, wherein the output voice further includes the input voice.

6. The method for adjusting voice frequency as claimed in claim 1, wherein the frequency of the frequency-shifting consonant should be no more than 12000 Hz and no less than 3000 Hz.

7. The method for adjusting voice frequency as claimed in claim 1, further comprising the step of not adjusting a vowel of the input voice.

8. A sound playing device, comprising:
a microphone detecting an ambient sound;
a processor receiving an input voice including a consonant, wherein when a frequency range of the consonant is overlapped with a frequency range of the ambient sound and an energy of the ambient sound is enough to disturb the consonant, the processor shifts the frequency range of the consonant to a target frequency range that is not overlapped with the frequency range of the ambient sound, wherein the target frequency is located in a closest frequency range to the frequency range of the consonant, where no other ambient sound exists or the energy of any ambient sound present in the target frequency is not enough to disturb the consonant; and
a speaker, which is electrically connected to the processor for playing the output voice.

9. The sound playing device as claimed in claim 8, wherein the target frequency is higher or lower than the frequency range of the consonant.

10. The sound playing device as claimed in claim 8, wherein when the energy of the ambient sound is M times the energy of the consonant, the processor determines that the ambient sound exists and the energy of the ambient sound is enough to disturb the consonant, where $0.3 \leq M \leq 10000$.

11. The sound playing device as claimed in claim 8, wherein when the energy of the ambient sound present in the target frequency is M times the energy of the consonant, the processor determines that the other ambient sound present in the target frequency exists and the energy of the ambient sound present in the target frequency is enough to disturb the consonant, where $0.3 \leq M \leq 10000$.

12. The sound playing device as claimed in claim 8, wherein the output voice further includes the input voice.

13. The sound playing device as claimed in claim 8, wherein the frequency of the consonant is adjusted to be no more than 12000 Hz and no less than 3000 Hz.

14. The sound playing device as claimed in claim 8, wherein the processor does not adjust a vowel frequency of the input voice.

* * * * *